Dec. 25, 1962  J. E. VOGEL  3,070,348
COMPOSITE ROTOR
Filed July 25, 1960
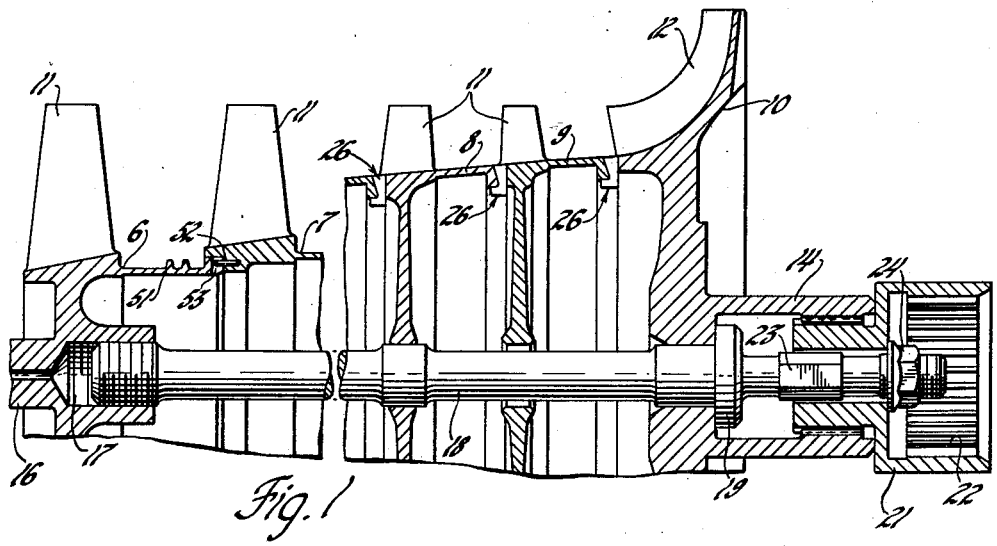
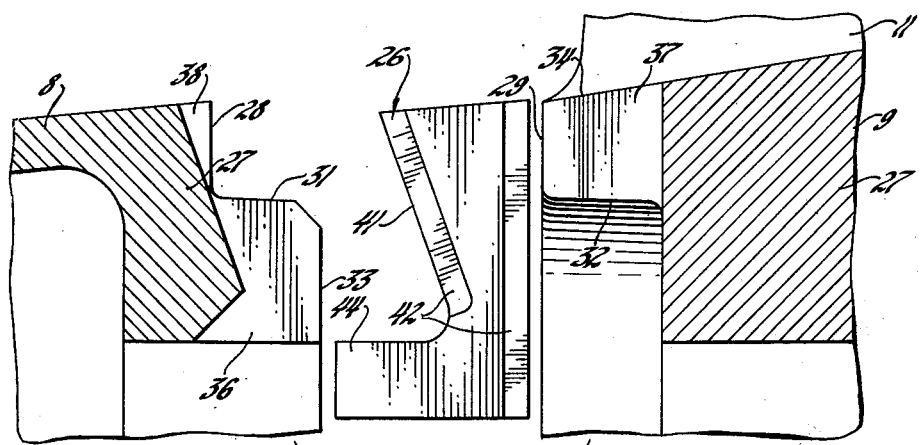
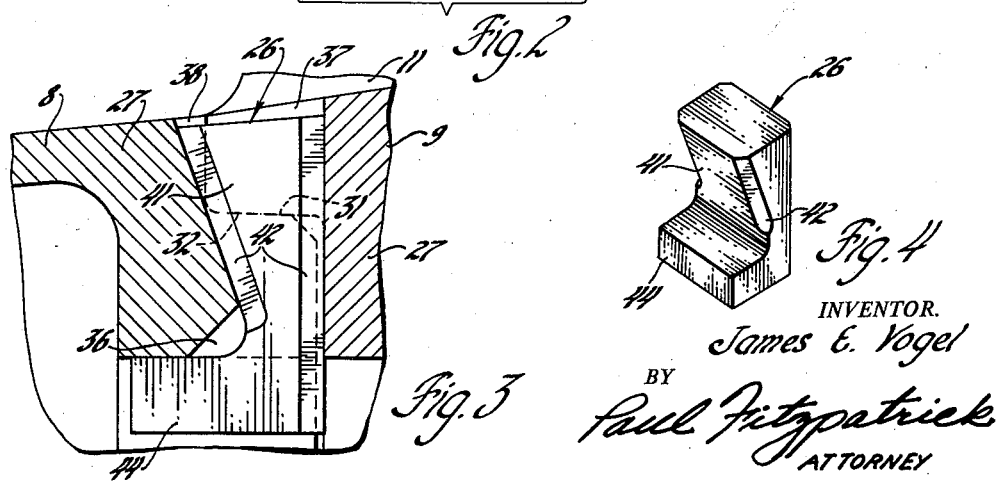
INVENTOR.
James E. Vogel
BY
Paul Fitzpatrick
ATTORNEY 3,070,348
COMPOSITE ROTOR
James E. Vogel, Indianapolis, Ind., assignor to General Motors Corporation, Detroit, Mich., a corporation of Delaware
Filed July 25, 1960, Ser. No. 44,943
5 Claims. (Cl. 253—39)

My invention relates to composite rotors; that is, rotors assembled from more than one part such as wheels, disks, or rings, which I will refer to hereafter as wheels. The invention is particularly intended for a rotor of a multi-stage axial-flow compressor and is so described herein, but is not so limited.

The invention may be summarized as involving the provision of radially extending tapered keys between adjacent wheels, which keys provide a positive torque transmitting connection between the wheels, the taper of the keys making it possible to employ them as wedges to separate the wheels for disassembly of the rotor.

The principal objects of the invention are to simplify and improve the structure and facilitate the assembly and disassembly of composite rotors, such as those of turbomachines.

The nature of the invention and the advantages thereof will be apparent to those skilled in the art from the succeeding detailed description of the preferred embodiment of the invention and the accompanying drawings thereof.

FIGURE 1 is a partial sectional view of the rotor of a compressor taken on a plane containing the axis of rotation thereof.

FIGURE 2 is an enlarged fragmentary view, taken on the same plane as FIGURE 1, showing the parts in disassembled relation.

FIGURE 3 is a view similar to FIGURE 2 after assembly of the parts.

FIGURE 4 is a perspective view of a key.

The compressor rotor in which the invention is embodied, as illustrated in FIGURE 1, comprises a series of coaxial wheels of which the first and second wheels 6 and 7 and the last three wheels 8, 9, and 10 are illustrated. These wheels are stacked in abutting relation with the rims of the wheels piloted into each other to assure an accurately aligned and centered rotor assembly. Axial-flow blades 11 extend from all the wheels except the final wheel 10 which is provided with centrifugal blading 12. The blades may be integral with the wheels or removable. A stub shaft 14 is integral with the wheel 10 and a stub shaft 16 with the wheel 6, these providing journals or providing for the mounting of anti-friction bearings by which the rotor is supported for rotation. Wheel 6 is bored and threaded at 17 for the threaded forward end of a tie bolt 18 which passes through the center of wheel 10 and includes a flange 19 bearing against this wheel. The tie bolt serves to hold the wheels assembled. The stub shaft 14 is internally splined to receive an externally splined portion of a coupling member 21 which is internally splined at 22 to receive a drive shaft for the compressor. Coupling member 21 also has a noncircular bore coacting with a hexagonal portion 23 of the tie bolt to hold it against backing off. A nut 24 threaded on the end of the tie bolt retains the coupling member 21.

As illustrated, a coupling or connection between compressor wheels in accordance with this invention is shown between wheels 8, 9, and 10 and also between wheel 8 and the partially illustrated wheel immediately upstream of it.

As will be more clearly apparent from FIGURES 2 and 3 which illustrate wheels 8 and 9 and a key 26 disposed between them, each wheel includes a rim 27, the rims extending rearwardly of each wheel to provide an interwheel spacer. The mating or abutting edges are machined so that the rearward edge of the rim has a radial surface 28 which abuts a forward surface 29 of the adjacent rim, and a cylindrical or slightly tapered surface 31 which pilots within a mating surface 32 machined or otherwise formed in the adjacent wheel. The forward wheel 8 thus has a flange 33 radially inward of the piloting surface 31 and the wheel 9 has a flange 34 radially outwardly of the surface 32. At a suitable number of circumferentially spaced points, as in the example illustrated, at four points spaced ninety degrees apart, a keyway for a key 26 is provided by a radial slot 36 in the flange 33 and a radial slot 37 in the flange 34. The continuation 38 of slot 36 extends through the outer portion of the rim 27 of wheel 8. These slots are of such dimensions as to accommodate and fit closely the key 26 when the wheels are assembled as shown in FIGURE 3. The key 26 comprises a tapered body portion 41 which is preferably substantially rectangular in cross section with the edges chamfered, as indicated at 42. The key extends radially of the rotor and diverges in the outward radial direction, the slot 36, 38 likewise departing from the radial direction to accommodate the forward face of the key. The key also includes a head 44 which abuts the inner surface of the flange 33 of wheel 8 when the rotor is assembled. The rear surface of the key abuts the forward face of the rim of wheel 27 and the bottom of the slot 37.

The assembly of adjacent wheels may be performed most easily with the axis of the rotor vertical and the forward faces of the wheels down in the embodiment illustrated. To assemble the wheels 8 and 9, for example, the keys 26 are laid in the slots 36 of wheel 8 and wheel 9 is fitted into place against wheel 8. This may be accomplished by tapping or by use of a press or by differential heating, depending upon the material and the nature of the fit between the wheels. It should be a close fit to prevent any relative radial movement of the wheels and provide a rigid rotor of stable dimensions and unvarying balance.

The keys 26 engage positively with the adjacent wheels and thereby provide positive means for transfer of torque from the wheel 10 through the successive wheels forward of it. They also greatly facilitate the separation of the rather tightly engaged wheels of the compressor when it becomes desirable to disassemble a rotor. Since the keys 26 are wedge-shaped, the wheels may be wedged apart very handily by driving them inwardly. The wedge shape of the keys also prevents their falling out of the rotor in a radially inward direction and the heads 44 restrain them against outward movement resulting from centrifugal force or other causes. It will be apparent that this mode of connection is applicable to wheels of various configuration and various materials including rings such as the wheel 7, which is specifically a ring, having no web.

Another mode of connection of rotor wheels is shown at the forward end of the compressor in which the flange 51 of wheel 6 pilots into a recess in the forward face of wheel 7 and the two are located circumferentially with respect to each other by pins 52 seated in wheel 7 and received in notches 53 in wheel 6. As will be apparent, this known arrangement for keying together two rotor wheels lacks the advantages of my invention.

The detailed description of the preferred embodiment of the invention to explain the principles thereof is not to be considered as limiting the invention, since many modifications may be made by the exercise of skill in the art within the scope of the invention.

I claim:
1. A composite rotor for a turbomachine or the like comprising, in combination, a plurality of coaxial wheels, portions of adjacent wheels being in radially and axially abutting relation, and means coupling the said portions for positive transmission of torque and facilitating disassembly of the wheels comprising a plurality of circumferentially spaced keys disposed at the junction of two abutting portions, each of the keys extending radially of the rotor and increasing in thickness axially of the rotor in the radially outward direction, and having a head at the radially inner end thereof, the said abutting portions having radial slots each disposed in said portions of both wheels providing tapered keyways dimensioned to accommodate the said keys, and the head of each key being in abutting relation to the radially inner surface of at least one said portion.

2. A composite rotor for a turbomachine or the like comprising, in combination, a plurality of coaxial wheels having rims, the rims of adjacent wheels being in axially abutting relation and being piloted one within the other with a close fit, and means coupling the rims for positive transmission of torque and facilitating disassembly of the wheels comprising a plurality of circumferentially spaced keys disposed at the junction of two abutting rims, each of the keys extending radially of the rotor and increasing in thickness axially of the rotor in the radially outward direction, and having a head at the radially inner end thereof, the said abutting rims having radial slots each disposed in both rims providing tapered keyways dimensioned to accommodate the said keys, and the head of each key being in abutting relation to the radially inner surface of at least one rim.

3. A rotor for a turbomachine or the like comprising, in combination, two coaxial wheels having flanges mutually abutting radially and axially, the flanges being configured to define between them a plurality of keyways, each keyway being within both flanges and decreasing in thickness axially of the wheels to thereby converge radially of the wheels toward the axis of the wheels, and a plurality of radially directed keys each mounted in a keyway and disposed in both said flanges so as to transmit torque positively between the wheels, the keys embodying a wedge portion decreasing in thickness axially of the wheels to thereby converge radially of the wheels toward the axis of the wheels to conform to the keyways and a head abutting an interior surface of one flange to retain the keys against centrifugal force.

4. A rotor for a turbomachine or the like comprising, in combination, two coaxial wheels having abutting portions piloted one within the other with a close fit, the abutting portions being configured to define between them a plurality of keyways, each keyway being within both abutting portions and decreasing in thickness axially of the wheels to thereby converge radially of the wheels toward the axis of the wheels, and a plurality of radially directed keys each mounted in a keyway disposed in both said portions so as to transmit torque positively between the wheels, the keys embodying a wedge portion decreasing in thickness axially of the wheels to thereby converge radially of the wheels toward the axis of the wheels to conform to the keyways and a head abutting an interior surface of one wheel to retain the keys against centrifugal force.

5. A rotor for a turbomachine or the like comprising, in combination, two coaxial wheels having abutting rims piloted one within the other with a close fit, the rims being configured to define between them a plurality of keyways, each keyway being within both rims and decreasing in thickness axially of the wheels to thereby converge radially of the wheels toward the axis of the wheels, and a plurality of radially directed keys each mounted in a keyway disposed in both said rims so as to transmit torque positively between the wheels, the keys embodying a wedge portion decreasing in thickness axially of the wheels to thereby converge radially of the wheels toward the axis of the wheels to conform to the keyways and a head abutting an interior surface of one wheel to retain the keys against centrifugal force.

References Cited in the file of this patent

UNITED STATES PATENTS

| | | |
|---|---|---|
| 883,926 | Alexander et al. | Apr. 7, 1908 |
| 2,660,399 | Robinson | Nov. 24, 1953 |
| 2,686,655 | Schorner | Aug. 17, 1954 |
| 2,741,454 | Eppley | Apr. 10, 1956 |
| 2,818,228 | Petrie | Dec. 31, 1957 |

FOREIGN PATENTS

| | | |
|---|---|---|
| 1,195,912 | France | Nov. 20, 1959 |